US012718671B1

(12) United States Patent
Sit

(10) Patent No.: US 12,718,671 B1
(45) Date of Patent: Aug. 25, 2026

(54) DECOY PACKAGE ALARM FOR THEFT DETERRENCE

(71) Applicant: PicClick, Inc, Rancho Santa Fe, CA (US)

(72) Inventor: Ryan Sit, Rancho Santa Fe, CA (US)

(73) Assignee: PicClick, Inc., Rancho Santa Fe, CA (US)

( * ) Notice: Subject to any disclaimer, the term of this patent is extended or adjusted under 35 U.S.C. 154(b) by 0 days.

(21) Appl. No.: 19/564,607

(22) Filed: Mar. 12, 2026

Related U.S. Application Data

(63) Continuation of application No. 19/335,905, filed on Sep. 22, 2025, now Pat. No. 12,602,972.

(60) Provisional application No. 63/803,006, filed on May 9, 2025.

(51) Int. Cl.
*G08B 13/14* (2006.01)

(52) U.S. Cl.
CPC ......... *G08B 13/14* (2013.01); *G08B 13/1436* (2013.01); *G08B 13/1463* (2013.01)

(58) Field of Classification Search
CPC ........ G06Q 10/00; G06F 17/60; G05B 19/00; G08B 13/06; G08B 13/14; G08B 13/1427; G08B 13/1436; G08B 13/22; G08B 13/1463; G08B 17/10; G08B 17/113
See application file for complete search history.

(56) References Cited

U.S. PATENT DOCUMENTS

| | | | | |
|---|---|---|---|---|
| 2002/0035857 A1* | 3/2002 | Stein | A47G 29/141 | 70/277 |
| 2009/0009346 A1* | 1/2009 | Hojmose | G08B 13/1436 | 340/628 |
| 2010/0332359 A1* | 12/2010 | Powers | G07C 9/00896 | 705/28 |
| 2014/0118145 A1* | 5/2014 | Wawrzyniak | G08B 21/0247 | 340/568.8 |
| 2026/0054919 A1* | 2/2026 | Walter | B65D 90/48 | |

* cited by examiner

*Primary Examiner* — Van T Trieu
(74) *Attorney, Agent, or Firm* — Manuel de la Cerra

(57) ABSTRACT

A decoy package that outwardly resembles a delivered parcel includes one or more internal motion sensors, a controller, and an audible alarm. When armed, the controller classifies sensed motion using multi-sensor fusion to distinguish incidental disturbances from removal attempts and, in response, actuates the audible alarm to emit a high-volume alert (90-105 dBA) which may be after a short delay (0.5-3 seconds) to obscure the source. Embodiments include adaptive thresholds via machine learning, strobes, voice warnings, anti-tamper detection, GPS geofenced safe zones, remote arming via app, customizable exteriors, weight simulation, and mesh networking of multiple decoys for coordinated alarms. Methods for deterring theft using such devices, including community deployment and home security integration, are disclosed. This invention applies a honeypot tactic from cybersecurity to physical package theft, leveraging psychology for cost-effective deterrence.

27 Claims, 8 Drawing Sheets

DECOY PACKAGE ALARM FOR THEFT DETERRENCE

CROSS-REFERENCE TO RELATED APPLICATIONS

This application claims priority to U.S. Provisional Application Ser. No. 63/803,006 filed on May 9, 2025, and as a continuation of U.S. application Ser. No. 19/335,905 filed on Sep. 22, 2025 and issued as U.S. Pat. No. 12,602,972 on Apr. 14, 2026. Both applications are incorporated herein by reference in their entireties. Both applications are incorporated herein by reference in their entireties.

TECHNICAL FIELD

The disclosed subject matter relates to security and theft-deterrence devices. More particularly, it concerns packages that are intentionally configured as decoys and that include onboard sensors and alarms to deter removal by unauthorized persons. The present disclosure further relates to systems and methods for deterring package theft in the e-commerce era through psychological deterrence, providing a cost-effective solution that can function independently or integrate with existing home security systems.

BACKGROUND

Package theft from residential delivery locations continues to be a widespread problem, particularly with the rise of e-commerce and home delivery services. As more consumers opt for the convenience of online shopping, the opportunity for theft of unattended packages left on doorsteps and porches has grown substantially. This problem affects urban, suburban, and rural areas alike, causing frustration and financial losses for both consumers and retailers. Existing approaches include camera-based monitoring, locked parcel boxes, delivery scheduling, weight-sensing mats or containers, surveillance cameras, secure delivery boxes, and requiring signatures for deliveries. While these solutions may record evidence or secure a delivered parcel, they can be costly, conspicuous, inconvenient, or limited in effectiveness. Many homeowners find themselves wanting to protect their purchases without compromising convenience. The psychological aspect of package theft prevention has received less attention, but deterrence strategies leveraging human behavior could offer more cost-effective solutions. There remains a need for an inexpensive, self-contained device that visually mimics a typical delivery parcel and deters theft at the moment a thief attempts removal, potentially creating a "halo" effect benefiting genuine deliveries.

Package theft around the world is a large and growing problem, especially after COVID in 2019 and a huge surge in e-commerce. According to a recent U.S. Postal Service Office of Inspector General report, at least 58 million packages were stolen in 2024. This issue is particularly severe in cities like New York City and Los Angeles. The problem worsened during and after COVID due to increased e-commerce adoption and rising inflation/costs. Current solutions are hard, more work, expensive, ineffective, or not implemented. Delivery boxes are not always used, doorbell cameras do not always deter and invade privacy, and booby traps like glitter bombs may pose legal risks or be prohibited in certain jurisdictions due to potential liability for harm or damage.

Various approaches to theft prevention have been developed. For example, U.S. Pat. No. 3,564,525 (Robeson et al.) discloses a robbery protection system using a dummy packet that resembles currency and marks a robber. While effective for bank robberies, it is not designed for package theft and requires infrastructure unsuitable for residential use. U.S. Pat. No. 10,321,780 describes a physical enclosure for securing packages rather than psychological deterrence. U.S. Pat. No. 11,111,699 presents a theft deterrent for bicycles. U.S. Pat. No. 11,532,219 (Modestine et al.) addresses parcel theft deterrence for audio/video devices like video doorbells. US Patent Publication No. 2004/0113778 A1 describes a portable motion detector and alarm for objects but does not disclose a decoy package for package theft. US Patent Publication No. 2008/0036618 A1 discloses a component for premises security, not tailored to package theft via decoy. These references are provided to place embodiments in context and are not admitted to be prior art.

As e-commerce expands, there is a pressing need for practical, affordable methods to protect delivered packages, ideally contributing to safer delivery environments for consumers, retailers, and services.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In some embodiments, a device comprises a decoy package that outwardly resembles an ordinary shipping parcel; one or more motion sensors disposed within the decoy package; a controller coupled to the motion sensors; and an audible alarm coupled to the controller. The controller is configured to classify sensed motion to distinguish incidental disturbances from removal attempts and, responsive to a removal attempt while the device is armed, to drive the audible alarm to emit a high-volume alert. In certain embodiments, the controller delays alarm actuation by a short interval to obscure the source of the alarm and increase the deterrent effect when multiple parcels are present. Optional features include: multi-sensor fusion (e.g., accelerometer plus tilt/pressure), geofence-defined safe zones, anti-tamper switches, visual strobes, remote arming/disarming, low-power mesh networking for coordinated alerts among multiple decoy packages, customizable exteriors mimicking specific branded packages, weight adjustment mechanisms, multi-stage alarms with warning tones, voice synthesis for alerts, GPS tracking, and machine-learning adaptation to routine ambient motion or handling patterns.

In another aspect, methods of deterring package theft are provided, including placing a decoy package at a delivery location, arming it, sensing and classifying motion, emitting staged audible/visual warnings after a delay, coordinating alarms among plural decoys via networking, and optionally integrating with home security systems for notifications or camera activation. The system may employ a honeypot-like tactic, leveraging uncertainty to deter theft attempts on all nearby packages.

The foregoing general description of the illustrative embodiments and the following detailed description thereof is merely exemplary aspects of the teachings of this disclosure and are not restrictive. The embodiments described in this summary are merely illustrative examples of various aspects that may be employed. These examples are not intended to limit the scope of the invention, which is defined solely by the claims. Various modifications, alternatives, and additional or different embodiments may be made without departing from the scope of the claims.

BRIEF DESCRIPTION OF THE DRAWINGS

The accompanying drawings, which are incorporated in and constitute part of this specification, illustrate example embodiments and together with the description, explain various principles of the disclosed embodiments. For clarity, simplicity, and flexibility, not all elements, components, or specifications are defined in all drawings. Not all drawings corresponding to specific steps or example embodiments are drawn to scale. Emphasis is instead placed on illustration of the nature, function, and product of the system and method described herein.

Embodiments described herein are exemplary and not restrictive. Embodiments will now be described, by way of examples, with reference to the accompanying drawings, in which.

DETAILED DESCRIPTION OF EXAMPLE EMBODIMENTS

Figure 1:
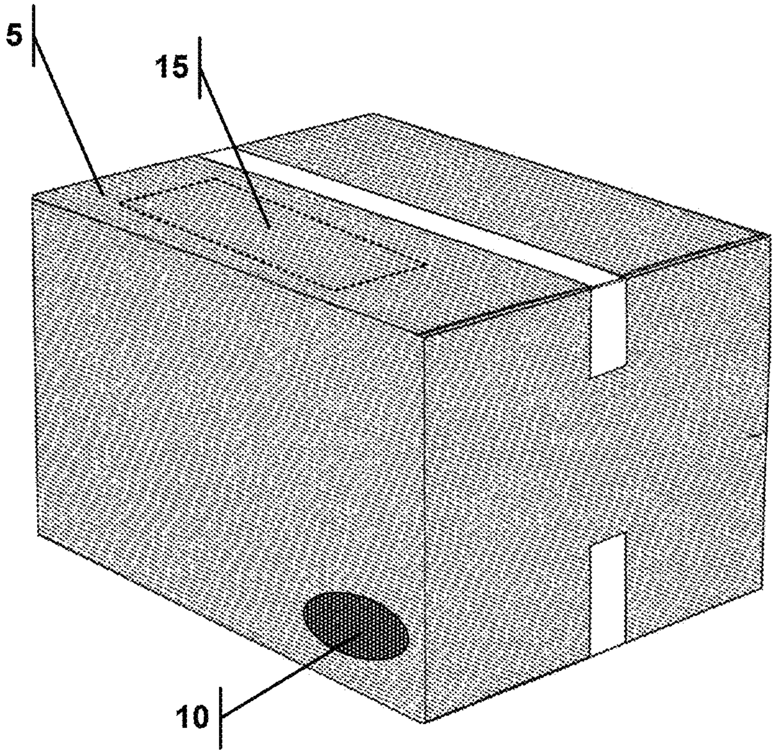
FIG. 1 is a perspective view of an example decoy package with exemplary acoustic ports and concealed access panel.

Reference is made herein to specific example embodiments, some of which are illustrated in the accompanying figures. While the subject matter is described in conjunction with these example embodiments, it will be understood that it is not intended to limit the scope of the claims to the configurations or implementations shown and described. To the contrary, it is intended that various alternatives, modifications, and equivalents be encompassed within the scope of the claims as would be apparent to persons of skill in the art.

In the following description, numerous specific details are set forth to provide a thorough understanding of certain example embodiments. However, implementations may be carried out without some or all these specific details. In other instances, process operations known to persons of ordinary skill in the art have not been described in detail so as not to obscure relevant aspects of the disclosed subject matter. Various components, operations, or relationships may be described in the singular for clarity, although multiple instances or variations may be employed in certain embodiments. Similarly, method steps are not necessarily presented in a required order, and some steps may be omitted or rearranged depending on the implementation. Furthermore, descriptions of connections or communications between entities should not be interpreted as requiring a direct or uninterrupted link, unless expressly stated; intermediate components or indirect relationships may be present in many embodiments. Furthermore, descriptions of connections or communications between entities should not be interpreted as requiring a direct or uninterrupted link, unless expressly stated; intermediate components or indirect relationships may be present in many embodiments.

Decoy Package 5
Acoustic Port 10
Concealed Panel 15
Alarm System 18
Controller 20
Transceiver 25
Audio Sensor 30
Motion Sensor(s) 35
Battery 40
GPS Module 45
Audible Alarm 50
Light(s)/Visual Deterrent(s) 55
Speaker 60
Haptic Generator 65
Remote 70
Box 72
Interior Box Flap 74
Housing 75
Mounting Clip 80
Clip Placement 82
Arm/Disarm Buttons 85
Arm/Disarm Status LED 90
Neighborhood 100
Decoy Package Location 105
Geofenced Safe Zone 110A
First Geofenced Alert Zone 110B
Second Geofenced Alert Zone 110C
Package Theft Route 115
Peer-to-Peer Decoy Packages (Alerting) 120
Peer-to-Peer Decoy Packages (Non-Alerting) 125
(Wireless) Graphical User Interface 200
Start Step of Motion-Classification Pipeline 300
Decision: Is Decoy Package Armed? 301
Authentication/Authorization Input 302
Decision: Is Authorized User Within Range? 303
Fused Data Inputs from Multitude of Sensors 304
Decision: Is Decoy Package Within Geofenced Safe Zone? 305
Decision: Is Tilt Angle Threshold Exceeded? 306A
Decision: Vertical Acceleration Threshold Exceeded? 306B
Logic/Boolean Operation Evaluation Step 307
Decision: Threshold Value Exceeds Min Time Duration? 308
Decision: Is Authorized Movement Pattern Detected? 309
Determination: Unauthorized Movement Detected 310
Determination: Authorized Movement Detected 311
Motion Classification Reset and Return to Start 300A The motivation for this invention stems from personal experiences and observations of the persistent problem of package theft. For instance, during the holiday season, a delivered gift was at risk of theft when the recipient was not home, highlighting the stress and frequency of such incidents. News articles from cities like New York and Los Angeles further underscored the scale of the issue. Despite efforts by major companies like Amazon, no low-cost, high-effectiveness solution existed. The invention solves this by applying a cybersecurity honeypot tactic to the physical world: a decoy box with a motion alarm that triggers upon pickup, leveraging psychology to make thieves drop all packages and flee.

The general utility of the invention is to deter package theft through a self-contained, decoy package that alarms loudly when moved, without protecting actual deliveries directly. It works by blending in as a real package, detecting motion via sensors, and emitting an alarm after a delay. Advantages over alternatives include low cost, ease of use, no privacy invasion (unlike cameras), and high effectiveness via psychological deterrence. Disadvantages may include the need for battery replacement and potential false alarms, though mitigated by sensor fusion. Best uses include placing on porches during delivery windows; variations involve multiple decoys, customizable boxes (e.g., mimicking iPhone or sneaker shipments), and integration with smart home systems like Ring or Nest for notifications.

Decoy Package Alarm System for Deterring Theft: As used herein, a "decoy package" comprises a housing whose exterior mimics a commercially delivered parcel (e.g., corrugated carton or polymailer dimensions, graphics, barcodes, shipping label facsimiles), potentially customizable to resemble specific branded packages like electronics or clothing shipments. A "removal attempt" is motion characteristic of lifting or carrying away the package, e.g., sustained vertical acceleration above a threshold, tilt beyond a threshold for a minimum duration, or translation exceeding a distance threshold. A "honeypot" refers to a decoy tactic exploiting uncertainty to deter theft.

The following description sets forth exemplary aspects of the present disclosure. It should be recognized, however, that such description is not intended as a limitation on the scope of the present disclosure. Rather, the description also encompasses combinations and modifications to those exemplary aspects described herein. The present disclosure relates to a decoy package alarm system designed to address the growing problem of package theft. This system employs an innovative approach to deter thieves by utilizing a honeypot-like tactic in the physical world. The decoy package alarm system may provide a cost-effective and efficient solution to package theft without directly securing delivered packages. The decoy package alarm system may leverage the concept of a honeypot, a technique commonly used in cybersecurity, to create a psychological deterrent against package theft. In some cases, the decoy package may be designed to be indistinguishable from genuine delivery packages, making it impossible for potential thieves to differentiate between real packages and the alarmed decoy. The honeypot approach may exploit the uncertainty and risk aversion of would-be thieves. In some implementations, the mere presence of a potential alarmed package may deter theft attempts on all packages in the vicinity. This psychological effect may extend beyond the specific decoy package, creating a protective "halo" that benefits genuine deliveries as well. To enhance the honeypot effect, the decoy package may incorporate various features to increase its authenticity. In some cases, the package may include realistic shipping labels, barcodes, and even simulated contents that create appropriate weight and sound when handled. These details may make it virtually impossible for a thief to distinguish the decoy visually or tactilely from a real package.

Decoy Package: The decoy package may be designed to closely resemble genuine delivery packages to effectively blend in with other parcels. In some cases, the decoy package may be constructed using common packaging materials such as cardboard, corrugated fiberboard, or plastic. The exterior of the decoy package may feature shipping labels, barcodes, and other markings typically found on legitimate packages to enhance authenticity. In some cases, the decoy package may be customized to mimic high-value items that are frequently targeted by thieves. For example, the decoy package may be designed to resemble a shipment containing electronics, such as a smartphone or laptop. The package may feature recognizable branding elements, product images, or dimensions consistent with popular electronic devices to increase its appeal to potential thieves. Alternatively, the decoy package may be styled to appear as a clothing or sneaker shipment. In some cases, the package may incorporate logos or design elements associated with well-known fashion brands. The size and shape of the decoy package may be tailored to match common clothing or footwear shipments, further enhancing its believability. To increase the effectiveness of the decoy package system, multiple decoy packages with alarms may be deployed simultaneously. This approach may make it more challenging for potential thieves to identify and avoid the alarmed packages. In some cases, the decoy packages may vary in size, shape, and apparent contents to create a diverse array of tempting targets. The design of the decoy package may also consider factors such as weight and durability. In some cases, the package may be weighted to feel substantial when lifted, mimicking the heft of a genuine parcel containing valuable items. The construction of the decoy package may be reinforced to withstand handling and potential rough treatment without compromising the integrity of the internal alarm system.

FIG. 1 illustrates the decoy package 5 and its outer housing that outwardly resembles a delivered shipping parcel. The housing may feature shipping labels complete with bar codes and packaging tape to resemble a valid delivered parcel. There may be additional features built into the housing, such as an acoustic port 10 or a concealed panel 15, which may house one or more sensors or other electronic components for the device to deter package theft. The outer dimensions and appearance of the decoy package 5, as well as any specific placement or positioning of its internal components, may vary from one housing to the next.

The housing may comprise a corrugated carton with concealed acoustic ports (element 10, FIG. 1) and a concealed access panel (element 15, FIG. 1) for battery replacement. The housing of the decoy package 5 may further comprise a weight adjustment mechanism to simulate contents of a valid delivered package. Accessing the concealed access panel 15 or the weight adjustment mechanism may involve removing or unsealing the packing tape on the decoy package 5 and opening a flap on the corrugated carton to access replacing the battery or adjusting the weight mechanism, then closing the flap on the corrugated carton and sealing the decoy package 5 with more packing tape. The housing may also comprise a detection mechanism for authorized or authenticated users, so that the decoy package 5 will not trigger an alarm while an authorized user opens the decoy package 5 to perform a weight adjustment operation or battery replacement operation. Conversely, the device may further comprise an anti-tampering sensor, which can be configured to trigger the audible alarm 50 when the housing is opened while armed. Additionally, the housing may have an exterior appearance customizable by a user to mimic expected deliveries without actual inclusion of protected brand assets, such as electronics or clothing packages.

Internally, the decoy package 5 will have one or more motion sensors 35 disposed within the housing, a controller 20 operatively coupled to the one or more motion sensors 35, and an audible alarm 50 operatively coupled to the controller 20. The decoy package 5 may have an armed state and a disarmed or unarmed state. When it is armed, the controller 20 within is configured to classify sensed motion to distinguish incidental disturbances from a removal attempt, and, responsive to the removal attempt, to drive the audible alarm 50 (also housed within the decoy package 5) to emit an acoustic output to deter an unauthorized person attempting to remove or steal the decoy package 5. The audible alarm deterrent may, in a non-limiting example, comprise an acoustic output of at least 90 dBA at 1 meter, after an activation delay between 0.5 and 3.0 seconds, preferably between 1.0 and 2.5 seconds. The output should be sufficiently loud to deter without violating typical residential noise ordinances. The activation delay is provided so that, when a package thief removes multiple packages from a delivery site, it will not be immediately evident which of the multiple packages is the decoy. The desired effect for the device is to startle the thief when a thief is carrying multiple packages, making the thief drop all the packages and run away.

Aside from the basic audible alarm deterrent mechanism, the controller 20 may trigger other outputs after it detects a decoy package 5 removal attempt by an unauthorized user. For example, the decoy package 5 may further comprise one or more visual indicators, connected via a wired or a wireless connection, configured to flash when the audible alarm 50 is emitted, potentially contributing to a greater combined effect when startling the thief. The visual indicators (lights) 55 may emit a strobe effect or a steady illumination in one or more colors. Furthermore, the audible alarm 50 may output more than a single alarm sound or a single frequency. In practice, the audible alarm 50 may comprise a frequency-swept siren pattern, and/or a recorded voice warning generated via voice synthesis and with multilingual capabilities.

The system may also employ variable deployment strategies to maintain its effectiveness over time. In some implementations, users may periodically change the appearance, size, or apparent contents of the decoy package. This variability may prevent thieves from learning to identify and avoid the decoy based on consistent characteristics. In some cases, the honeypot deterrence may be amplified by community-wide implementation. If multiple households in a neighborhood deploy similar decoy package systems, the uncertainty for potential thieves may increase significantly. This widespread adoption may create a broader deterrent effect, potentially reducing package theft attempts throughout the entire area. The psychological impact of the honeypot approach may extend beyond immediate deterrence. In some implementations, the system may include features that simulate the consequences of theft, such as a voice recording that mimics a police dispatch call when the alarm is triggered. This simulation may further exploit the risk aversion of potential thieves, enhancing the overall deterrent effect of the system. In some cases, the decoy package alarm system may include a motion-triggered alarm concealed within a package that resembles a typical delivery. The system may leverage human psychology and the element of surprise to discourage potential thieves. When activated, the alarm may produce a loud sound, potentially startling the thief and alerting nearby residents. The decoy package alarm system may offer several advantages over traditional package security methods. In some cases, the system may be easily deployable, require minimal maintenance, and potentially provide a deterrent effect that extends beyond the decoy package itself. The system may also avoid some of the privacy concerns associated with other security measures, such as video surveillance.

Unlike existing security systems that focus on surveillance, physical barriers, or post-theft tracking, the decoy package alarm system presented herein exploits the psychological aspects of theft deterrence through immediate auditory feedback when a theft is attempted. The innovation lies in its simplicity, portability, and effectiveness as a standalone solution that requires no integration with other systems or infrastructure. The decoy package alarm system offers several unexpected advantages over prior art solutions. First, it provides an immediate deterrent effect at the critical moment when a theft is being attempted, potentially preventing the theft entirely rather than merely documenting it or aiding in recovery. Second, its design as a self-contained unit that closely resembles actual delivery packages represents a significant advancement over bulkier, more obvious security devices that thieves might recognize and avoid. Third, the system's versatility in terms of alarm sounds, delay mechanisms, and remote-control capabilities allows for a customized approach to theft deterrence that can be adapted to different environments and circumstances. The technical solution provided by this invention addresses the specific technical problem of unattended package theft in a way that is more accessible, affordable, and psychologically effective than existing alternatives. Those skilled in the art will recognize that various modifications and variations can be made without departing from the spirit and scope of the invention. By introducing an element of risk and uncertainty for potential thieves, the decoy package alarm system may contribute to reducing package theft incidents in residential areas. The system may be particularly useful in urban environments or locations with high rates of package theft, where traditional security measures may be impractical or insufficient.

The invention comprises parts including: housing (decoy box), motion sensors (e.g., accelerometer, gyroscope), controller (microcontroller with software), audible alarm (speaker), power source (battery), and optional components like GPS, lights, voice synthesis. These work together: sensors detect motion, controller classifies it, and if a removal attempt, activates alarm after delay. The "old" parts are basic sensors and alarms; improvements include honeypot application, delay for obfuscation, multi-sensor fusion, and psychological leveraging.

Critical parts may include: alarm volume (90-105 dB,), delay (0.5-3 s), sensor thresholds (e.g., 0.2 g acceleration), battery life (6 months standby).

Figure 2:
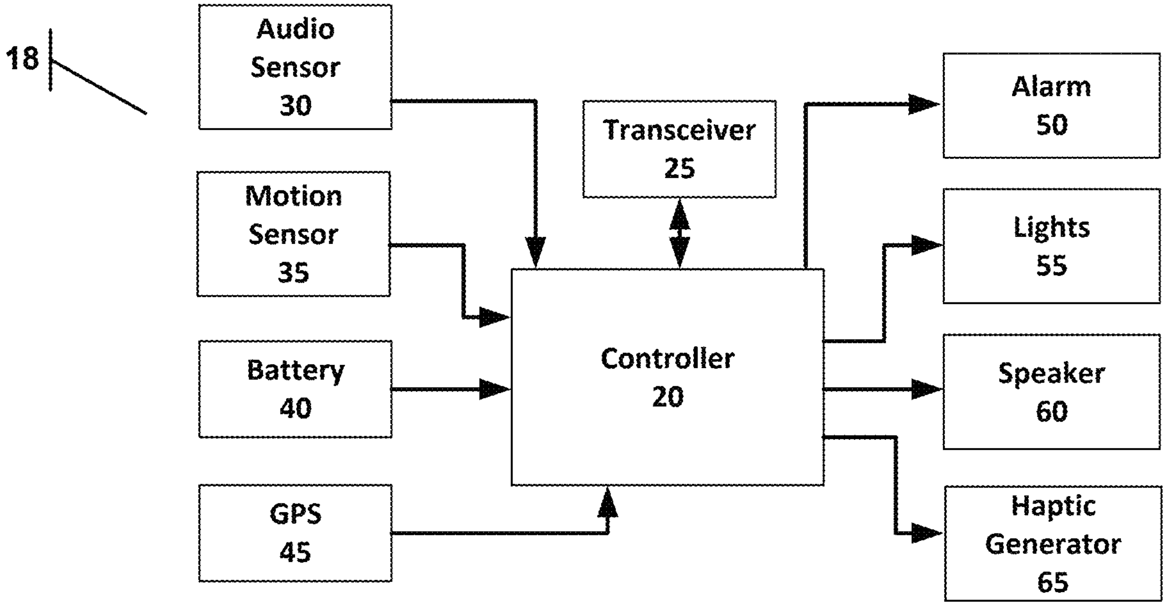
FIG. 2 is a block diagram of an example electronics architecture including sensors, controller, power, and output devices.

FIG. 2 shows example components that could be included in the package-theft deterrence system, multiple inputs/outputs that could be operatively coupled to the controller 20. These components together form the alarm system 18, that may be integrated into an alarm specific box as shown in FIG. 1, or may be housed in housing 75 as part of a retrofit kit (see FIGS. 4A-4C).

The system 18 may include additional inputs such as one or more audio sensors 30, one or more motion sensors 35, a battery 40, a GPS unit or module 45, a transceiver 25, as well as multiple outputs including the transceiver 25, one or more audible alarms 50, one or more lights or visual indicators 55, one or more speakers 60, and/or one or more haptic generators 65 either as features housed within the decoy package 5, or features residing outside the decoy package 5 but controller nonetheless by the controller 20 inside the decoy package 5. For example, the device or system may further comprise a wireless graphical user interface 200 (see FIG. 3A) configured to receive an arm command or a disarm command from a remote control or mobile application. This wireless interface 200 can be further configured to publish an alarm event to a home security system to trigger additional notifications or camera activation. The device or system may further comprise a wireless remote 70, shown as a key fob in FIG. 3B, that may arm and disarm the decoy package. Such a wireless remote 70 simplifies the system/device and simplifies setup and operation. The components shown in FIG. 2 are meant to be exemplary, but in no way are they to limit the range or scope of what the controller 20 may interact with. The one or more motion sensors 35 shown in FIG. 2 may optionally comprise at least two different sensor types, selected from: accelerometer, gyroscope, tilt sensor, pressure or weight sensor, barometric sensor, vibration sensor, elevation change sensor, or proximity sensor, and the controller 20 is configured to fuse outputs of the sensor types to determine whether the decoy package 5 has been moved by an unauthorized user, and when to sound the alarm and/or generate further outputs, such as lights or wireless signals. The next paragraphs will elaborate more upon components of the present invention.

Motion Sensor: The decoy package alarm system may incorporate various types of motion sensors 35 to detect when the package is being moved or tampered with. In some cases, the motion sensor may be a gyroscope, which can detect changes in the package's orientation. The gyroscope may be configured to trigger the alarm when the package is tilted beyond a certain angle or rotated rapidly. In some cases, an accelerometer may be used as the motion sensor. The accelerometer may detect sudden movements or changes in velocity, potentially indicating that the package is being picked up or carried away. The sensitivity of the accelerometer may be adjustable to prevent false alarms from minor vibrations or environmental factors. A vibration sensor may be implemented in some cases to detect subtle movements or disturbances of the package. This type of sensor may be particularly useful for detecting attempts to open or manipulate the package without fully lifting it. In some cases, a pressure sensor or weight sensor may be incorporated into the base of the decoy package. This sensor may detect when the package is lifted off the ground, triggering the alarm. The pressure sensor may be calibrated to account for the weight of the package itself to avoid false alarms. An elevation change sensor may be used in some implementations of the decoy package alarm system. This sensor may detect vertical movement, such as when the package is lifted or carried upstairs. The elevation change sensor may be configured with a threshold to differentiate between intentional lifting and minor fluctuations due to environmental factors. The placement of the motion sensor within the decoy package may vary depending on the specific type of sensor and the desired sensitivity. In some cases, the sensor may be positioned near the center of the package to detect movement in any direction. Alternatively, multiple sensors may be placed at different locations within the package to provide comprehensive coverage and improve accuracy in detecting various types of motion. The sensitivity of the motion sensor may be adjustable in some implementations. This feature may allow users to customize the system's responsiveness based on factors such as the package's location, expected environmental conditions, or the desired level of security. In some cases, the sensitivity adjustment may be accessible through an external interface or a mobile application connected to the decoy package alarm system. In some cases, the decoy package alarm system may utilize a combination of different motion sensor 35 types to enhance its effectiveness and reduce the likelihood of false alarms. For example, data from a gyroscope and an accelerometer may be combined to provide more accurate motion detection and differentiate between intentional movement and environmental disturbances. The motion sensor may be designed to operate with low power consumption to extend the battery life of the decoy package alarm system. In some cases, the sensor may enter a sleep mode when no motion is detected for an extended period, and quickly activate when movement is sensed.

To reduce nuisance alarms from incidental motion such as wind, pets, or vibration, the controller may implement a motion-classification pipeline. Sensor data are filtered and evaluated against thresholds for vertical lift (e.g., $\Delta g$ or barometric $\Delta h$), tilt (e.g., $>\theta$ degrees for $\geq T$ milliseconds), and translation (e.g., velocity/jerk thresholds). In multi-sensor implementations, the controller applies sensor fusion—for example, fusing accelerometer and gyroscope signals with a complementary filter and evaluating a decision tree using at least two sensor types. In adaptive embodiments, the controller stores background motion statistics, learns typical handling patterns via machine-learning algorithms, and adjusts thresholds over time to reduce false alarms.

Audible Alarm: The decoy package alarm system may incorporate an audible alarm 50 designed to startle potential thieves and alert nearby residents. In some cases, the audible alarm may be configured to produce a loud sound at a volume that is within legal limits for residential areas. The alarm volume may be adjustable to accommodate different environments and user preferences. The audible alarm 50 may utilize various sound patterns to maximize its effectiveness. In some cases, the alarm may emit a continuous, high-pitched tone similar to traditional house alarms. Alternatively, the alarm 50 may produce a series of rapid, pulsating beeps reminiscent of fire alarms. The sound pattern may be designed to be easily recognizable and associated with emergency situations, potentially increasing the likelihood of a quick response from the thief or nearby individuals. In some implementations, the audible alarm 50 may be programmed with multiple sound options. Users may be able to select from a range of pre-recorded alarm sounds, such as sirens, buzzers, or even voice recordings warning of theft in progress. This flexibility may allow users to choose an alarm sound that is most appropriate for their specific location and circumstances. The power source for the audible alarm 50 may vary depending on the specific implementation of the decoy package alarm system. In some cases, the alarm 50 may be powered by replaceable batteries 40, allowing for extended periods of operation without the need for external power sources. Alternatively, the alarm 50 may incorporate a rechargeable battery system 40 that can be easily recharged between uses. To enhance the effectiveness of the decoy package alarm system, the audible alarm 50 may incorporate a delay mechanism. In some cases, the alarm activation may be delayed by 0.5 to 3 seconds after the motion sensor detects movement. This delay may make it more challenging for potential thieves to immediately identify which package contains the alarm, potentially increasing the deterrent effect and the likelihood of the thief abandoning all packages. The duration of the audible alarm may be configurable in some implementations. Users may be able to set the alarm to sound for a specific period, such as 30 seconds, 1 minute, or until manually deactivated. The controller 20 may enforce an alarm duration between 60 seconds and 180 seconds and a lockout interval thereafter.

In some cases, the alarm 50 may include an automatic shut-off feature to conserve battery life and to comply with local noise ordinances. In some cases, the alarm activation may be delayed by a predetermined time period after the motion sensor detects movement. This delay period may range from about 0.1 seconds to about 10 seconds, preferably from about 0.5 seconds to about 5 seconds, and most preferably from about 1 second to about 3 seconds. This delay may make it more challenging for potential thieves to immediately identify which package contains the alarm, potentially increasing the deterrent effect and the likelihood of the thief abandoning all packages. To increase the alarm's effectiveness, the decoy package alarm system may incorporate multiple speakers or sound emitters. In some cases, these may be strategically placed within the package to create a more disorienting effect when activated. The use of multiple sound sources may also help to increase the overall volume and coverage area of the alarm 50. In some implementations, the audible alarm 50 may be designed with weatherproofing features to ensure reliable operation in various environmental conditions. This may include sealed speaker enclosures and water-resistant components to protect against moisture and temperature fluctuations. In some cases, the audible alarm may be configured to produce a loud sound at a volume that ranges from about 70 decibels to about 130 decibels, preferably from about 90 decibels to about 105 decibels. This volume range is within legal limits for residential areas while being sufficiently loud to startle thieves and alert nearby residents. The duration of the audible alarm may be configurable in some implementations. Users may be able to set the alarm to sound for a specific period ranging from about 10 seconds to about 10 minutes, preferably from about 30 seconds to about 5 minutes, and most preferably from about 1 minute to about 3 minutes, or until manually deactivated. The decoy package alarm system may also include features to prevent tampering with the decoy package 5 or the audible alarm 50. In some cases, the alarm 50 may be designed to activate if the package 5 is opened or if attempts are made to disable the sound-emitting components. This anti-tampering feature or sensor may help to maintain the integrity of the alarm system and discourage attempts to circumvent its operation. Anti-tampering sensors may include but are not limited to a reed switch, micro-switch, or pressure sensor.

Lights: In some implementations, the decoy package alarm system may incorporate visual deterrents 55 in addition to audible alarms 50. The system may include one or more light-emitting components 55 designed to activate when the one or more motion sensors 35 detects movement of the decoy package 5. The light-emitting components 55 may utilize various types of illumination sources. In some cases, the system may employ high-intensity LED lights 55 capable of producing a bright, attention-grabbing flash. These LEDs 55 may be strategically placed within the decoy package 5 to maximize visibility when activated. The system may offer multiple lighting modes to enhance its effectiveness. In some implementations, the lights 55 may be configured to produce a rapid strobe effect when triggered. This strobing pattern may disorient potential thieves and draw immediate attention to the package. Alternatively, the system may use a steady, bright illumination to clearly highlight the package 5 and the surrounding delivery area. Color may play a significant role in the visual deterrent system. In some cases, the lights may be designed to emit a bright red color, commonly associated with warnings and emergencies. Other implementations may use alternating colors, such as red and blue, to simulate the appearance of law enforcement lights. The placement of lights 55 within the decoy package 5 may vary depending on the specific design. In some cases, lights may be positioned to illuminate through small openings or translucent sections of the package exterior. This approach may maintain the decoy's appearance while allowing for effective light emission when activated. The light-based deterrent system may be integrated with the audible alarm 50 and motion sensor 35 components. In some implementations, the lights 55 may activate simultaneously with the sound alarm 50. Alternatively, the system may be configured to trigger the lights 55 first, followed by the audible alarm 50 after a short delay, potentially increasing the psychological impact on would-be thieves.

Power management may be a key consideration for the light-based system. In some cases, the lights may be designed to operate efficiently to conserve battery life. The system may incorporate adaptive brightness controls, adjusting light intensity based on ambient light conditions to optimize visibility and power usage. The visual deterrent system may offer customization options to the user. In some implementations, users may be able to select from various light patterns, colors, or activation sequences through the control system wireless graphical user interface 200. This customization may allow users to tailor the deterrent effect to their specific environment or preferences. Integration with smart home systems may further enhance the effectiveness of the light-based deterrent. In some cases, the decoy package lights 55 may be configured to trigger additional smart lights in the home or outdoor areas when activated. This expanded illumination may increase the visibility of the theft attempt and may potentially alert neighbors or passersby. The system may also incorporate light sensors to enhance its functionality. In some implementations, these sensors may detect ambient light levels, allowing the system to adjust its light output for maximum effectiveness in various lighting conditions. This feature may ensure optimal visibility whether the package is placed in bright daylight or low-light evening settings. Weather resistance may be a crucial aspect of the light-based system design. In some cases, the light components 55 may be sealed and protected to withstand various environmental conditions, ensuring reliable operation in rain, snow, or extreme temperatures. The visual deterrent system may also serve a dual purpose as a locator for legitimate recipients. In some implementations, authorized users may be able to activate the lights 55 remotely through a mobile application, helping them quickly locate their package among multiple deliveries. By incorporating these light-based features, the decoy package alarm system may provide a multi-sensory deterrent effect, combining visual and audible elements to maximize its effectiveness in preventing package theft.

GPS: In some implementations, the decoy package alarm system may incorporate GPS technology to enhance its functionality and provide location-based activation features. The system may include a GPS module 45 integrated within the decoy package 5, allowing for precise tracking and geofencing capabilities. The GPS module 45 may continuously monitor the decoy package's location, providing real-time data to the control system 20. In some cases, this location information may be accessible to the user through a mobile application or web interface 200, allowing them to track the decoy package's movements and status. The system may utilize geofencing technology to create virtual boundaries around specific areas. In some implementations, users may define a "safe zone" 110A around their property, such as the area encompassing their front porch or driveway. The alarm system may be configured to remain inactive while the package 5 is within this designated safe zone 110A (e.g. see decoy package location 105, geofenced safe zone 110A, FIG. 7). When the GPS module detects that the decoy package has moved beyond the predefined safe zone, it may automatically trigger the alarm system. This feature may allow for more precise activation of the alarm, reducing false alarms while ensuring that any unauthorized movement of the package is immediately detected. The GPS-based activation may also enable dynamic alarm settings based on the package's location. In some cases, the system may be programmed to adjust its sensitivity or alarm volume depending on whether the package is in a residential area, commercial district, or other defined zones. Integration with mapping services may further enhance the system's capabilities. In some implementations, the GPS data may be used to provide turn-by-turn tracking of the package's movement if it is removed from the premises. This information may be valuable for law enforcement in recovering stolen packages and apprehending thieves. The GPS feature may also facilitate community-based theft prevention efforts. In some cases, users may opt to share anonymized location data with local law enforcement or neighborhood watch groups, creating a network of monitored areas that may deter package theft on a broader scale. Power management may be a key consideration for the GPS-enabled system. In some implementations, the GPS module may utilize low-power modes or intermittent activation to conserve battery life while maintaining effective tracking capabilities. The system may also incorporate motion-based activation of the GPS, only engaging full tracking when movement is detected. The GPS functionality may be integrated with other smart home systems to provide additional features. In some cases, the system may trigger home automation actions based on the package's location, such as activating outdoor lighting or security cameras when the package approaches the property. Privacy considerations may be addressed through user-configurable settings. In some implementations, users may have the option to limit GPS tracking to specific time windows or disable it entirely, relying solely on the motion-based alarm activation. The GPS-enabled decoy package system may also offer benefits for legitimate delivery tracking. In some cases, users may temporarily deactivate the alarm function and use the GPS feature to monitor the progress of expected deliveries, providing an additional layer of convenience and security for valuable shipments. By incorporating GPS technology, the decoy package alarm system may offer enhanced precision in activation, improved tracking capabilities, and expanded integration with smart home ecosystems, further increasing its effectiveness as a deterrent against package theft.

Voice: In some implementations, the decoy package alarm system may incorporate voice capabilities to enhance its deterrent effect and provide additional functionality. The system may include a speaker and voice synthesis module integrated within the decoy package, allowing for audible communication and customizable voice alerts. The voice synthesis module may be capable of generating a range of human-like voices and tones. In some cases, users may be able to select from a variety of pre-recorded voice options, including male, female, or even child voices, to best suit their preferences or the specific deterrent scenario. When triggered by unauthorized movement, the system may emit voice warnings in addition to or instead of traditional alarm sounds. For example, the decoy package may loudly announce phrases such as "Package theft detected!" or "Security alert! This package is being monitored." These voice alerts may startle potential thieves and draw immediate attention to the theft attempt. The voice system may incorporate escalating warning levels. In some implementations, the initial voice alert may be a calm but firm warning, which may then progress to more urgent and louder messages if movement continues. This escalation may provide an opportunity for accidental triggers to be resolved while ensuring that persistent theft attempts receive maximum attention. Multilingual capabilities may be included in the voice system. In some cases, users may be able to configure the decoy package to issue warnings in multiple languages sequentially, increasing the likelihood that the message will be understood by a wider range of individuals in diverse communities. The voice feature may also serve as a communication tool for legitimate recipients. In some implementations, authorized users may be able to remotely activate a voice message through a mobile application. This could allow them to leave instructions for delivery personnel or communicate with family members about the package's arrival. Integration with smart home systems may further enhance the voice capabilities. In some cases, the decoy package's voice alerts may trigger additional voice announcements through connected smart speakers throughout the home or property, creating a comprehensive audio alert system. The voice system may incorporate adaptive volume control. In some implementations, built-in microphones may detect ambient noise levels, allowing the system to adjust its voice volume to ensure clarity and audibility in various environmental conditions, from quiet neighborhoods to busy urban settings. Customization options may allow users to record their own voice messages for the system. In some cases, this personalization may increase the effectiveness of the deterrent, as potential thieves may be more likely to believe and respond to a resident's voice rather than a generic pre-recorded message. The voice system may also include interactive elements. In some implementations, the decoy package may be programmed to respond to simple voice commands, allowing users to arm, disarm, or check the status of the system using verbal cues. This feature may enhance user convenience and accessibility. Privacy considerations may be addressed through selective voice activation. In some cases, users may have the option to schedule voice alerts only during specific hours or to disable voice features entirely in favor of traditional alarm sounds. Power management for the voice system may be optimized to extend battery life. In some implementations, the voice synthesis module may enter a low-power standby mode when not in use, activating quickly when triggered by the motion sensor or user commands. By incorporating these voice-based features, the decoy package alarm system may provide a more dynamic and personalized deterrent effect. The addition of human-like voice warnings and interactive capabilities may significantly enhance the system's effectiveness in preventing package theft and improving user experience.

Arming and Control System: The decoy package alarm system may incorporate a control system to manage various aspects of its operation. In some cases, the control system may include arming and disarming mechanisms to activate or deactivate the alarm as needed. The control system may offer multiple options for arming the decoy package alarm. In some cases, the system may be armed using a remote-control device, like a car alarm system. The remote control may allow users to arm or disarm the alarm from a distance, providing flexibility in managing the system's activation. Alternatively, the control system may incorporate a timed delay feature for arming the alarm. In some cases, this feature may function similarly to a home alarm system, allowing users to set a delay period before the alarm becomes active. This delay may provide time for the user to place the decoy package in the desired location without triggering the alarm. The control system may also include integration capabilities with existing home security systems. In some cases, the decoy package alarm may be designed to work in conjunction with popular smart home security platforms such as Ring or Nest. This integration may allow the home security system to detect the sound of the decoy package alarm when activated. When integrated with a smart home security system, the control system may enable additional notification features. In some cases, if the decoy package alarm is triggered, the home security system may send an alert to the user's smartphone or other connected devices. This notification may provide real-time information about potential package theft attempts. The control system may offer various user interface options for managing the decoy package alarm. In some cases, a smartphone application may be developed to provide remote control and configuration capabilities. The app may allow users to arm or disarm the alarm, adjust sensitivity settings, or customize alarm sounds from their mobile devices. In some implementations, the control system may incorporate scheduling features. Users may be able to set specific time periods during which the decoy package alarm is active. This functionality may be useful for aligning the alarm's operation with expected delivery times or periods when the user is away from home. The control system may also include diagnostic and maintenance features. In some cases, the system may provide notifications about low battery levels or other operational issues. This proactive approach may help ensure the decoy package alarm remains functional and ready for use when needed. To enhance security, the control system may incorporate encryption and authentication mechanisms. In some cases, these features may protect against unauthorized access or tampering with the alarm system's settings. This added layer of security may be particularly important for systems that can be controlled remotely or integrated with other smart home devices. The control system may also manage power consumption to optimize battery life. In some implementations, the system may include power-saving modes that reduce functionality during periods of inactivity. These modes may be automatically activated based on user-defined schedules or manually triggered through the control interface.

Arming options may include (i) a local concealed switch; (ii) remote (e.g., sub-GHz or BLE); (iii) a companion mobile application for scheduling, sensitivity adjustments, and customization; (iv) scheduled arming windows aligned with delivery times; or (v) timed delays similar to home alarms. In some embodiments, a geofenced safe zone is defined via GPS module; while the decoy remains within the zone, removal by an authorized user does not trigger the alarm. The control system may integrate with smart home platforms (e.g., Ring, Nest) to publish alarm events, trigger cameras, or send notifications. Power management includes sleep modes and low-power modes for extended battery life (e.g., 6 months standby).

System Integration and Operation: The decoy package alarm system may integrate various components to create an effective theft deterrent solution. In some cases, the system may combine the decoy package, motion sensor, audible alarm, and control system to work in concert, providing a comprehensive approach to package theft prevention. The operation of the decoy package alarm system may begin with the user arming the device. In some cases, this may be accomplished through a remote control or a mobile application connected to the control system. Alternatively, the system may utilize a timed delay feature, allowing the user to place the decoy package in the desired location before the alarm becomes active. Once armed, the decoy package may remain in a dormant state until movement is detected. The motion sensor within the package may continuously monitor for any disturbances. In some cases, when a potential thief attempts to lift or move the package, the motion sensor may detect this activity and trigger the alarm sequence. Upon activation, the system may initiate a brief delay before sounding the audible alarm. This delay, which may range from 1 to 3 seconds in some implementations, may serve to confuse the thief about which package contains the alarm. After the delay, the audible alarm may emit a loud sound, potentially startling the thief and alerting nearby residents or passersby.

The control system may, for example, publish an alarm event to a home automation hub or a home alarm to trigger additional devices. The alarm event may be emitting a distinct acoustic alarm that can be detected by a home automation hub or home alarm, which may then (1) notify the user that the package alarm has been triggered, and/or (2) trigger the home alarm. In addition to, or instead of, the acoustic alarm, the control system may send a wireless signal as the alarm event.

The integration of the decoy package alarm system with existing home security platforms may enhance its effectiveness. In some cases, when the alarm is triggered, it may also activate connected security cameras or send notifications to the homeowner's mobile device. This integration may provide additional deterrence and increase the likelihood of identifying the would-be thief. The system may be effective in various scenarios. For example, in a situation where multiple packages are present on a porch, including the decoy, a thief may be deterred from taking any packages once the alarm sounds. In another scenario, the system may be particularly useful during holiday seasons or in areas with high rates of package theft, where its presence may discourage potential thieves from targeting the location. The decoy package alarm system may also be effective in apartment buildings or shared living spaces. In some cases, the loud alarm may alert neighbors or building security personnel, potentially leading to quicker response times and increased community awareness of package theft attempts. The system's flexibility in terms of package design and alarm customization may allow users to adapt it to their specific needs and environment. In some cases, users may choose to deploy multiple decoy packages with different appearances and alarm sounds, further increasing the uncertainty for potential thieves and enhancing the overall deterrent effect. The control system may play a crucial role in managing the operation of the decoy package alarm system. In some cases, it may allow users to adjust sensitivity settings, customize alarm durations, or schedule active periods to align with expected delivery times. This level of control may help reduce false alarms while maintaining effective protection during high-risk periods. The integration of power management features within the control system may ensure long-term operation of the decoy package alarm. In some cases, the system may enter low-power modes during periods of inactivity, extending battery life and reducing the need for frequent maintenance. By combining these various components and features, the decoy package alarm system may provide a comprehensive and adaptable solution to the growing problem of package theft. The system's ability to startle thieves, alert residents, and integrate with existing security measures may create a multi-layered approach to deterrence and protection. Several implementations have been described. Nevertheless, it will be understood that various modifications may be made without departing from the spirit and scope of the disclosure. Accordingly, other implementations are within the scope of the present invention.

Figure 4B:
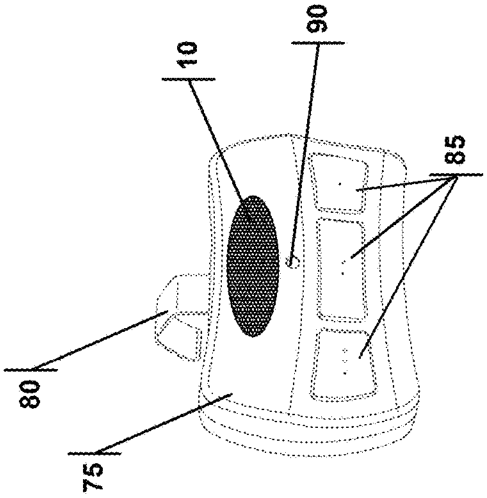
FIG. 4B illustrates the front of a device that may be mounted to the interior of a box.
Figure 4C:
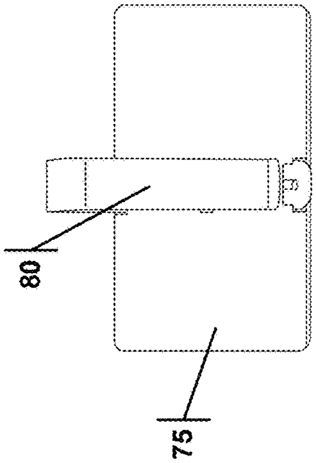
FIG. 4C illustrates the back of the device that may be mounted to the interior of a box.
Figure 4A:
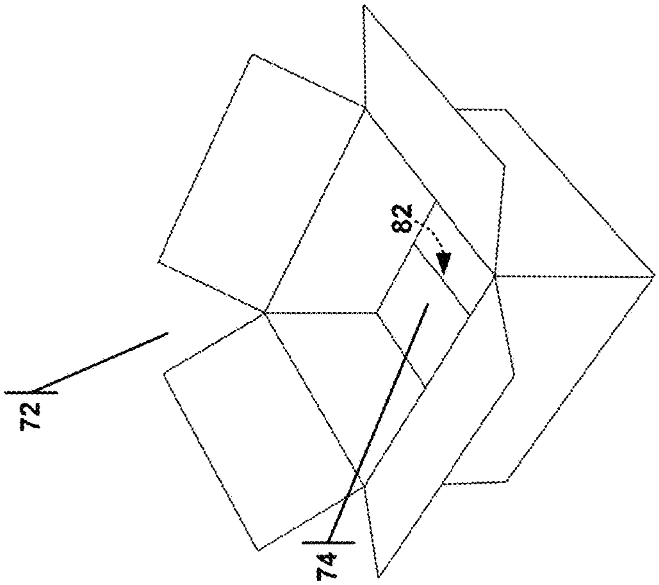
FIG. 4A illustrates a box that may be used with a retrofit kit.

Retrofit Kit: FIGS. 4A-4C illustrate an alarm system 18 enclosed in a housing 75. The housing 75 may have a mounting clip 80, an acoustic port 10, arm/disarm buttons 85 and an arm/disarm status LED 90. The housing 75 may mount to the interior box flap 74 using the mounting clip 80 as position 82. Other mounting methods, including but not limited to, adhesives and hook and loop fasteners may be used. The housing 75 allows a user to select the decoy box 72, allowing specific types of boxes to use, enhancing the honeytrap effect.

Figure 5:
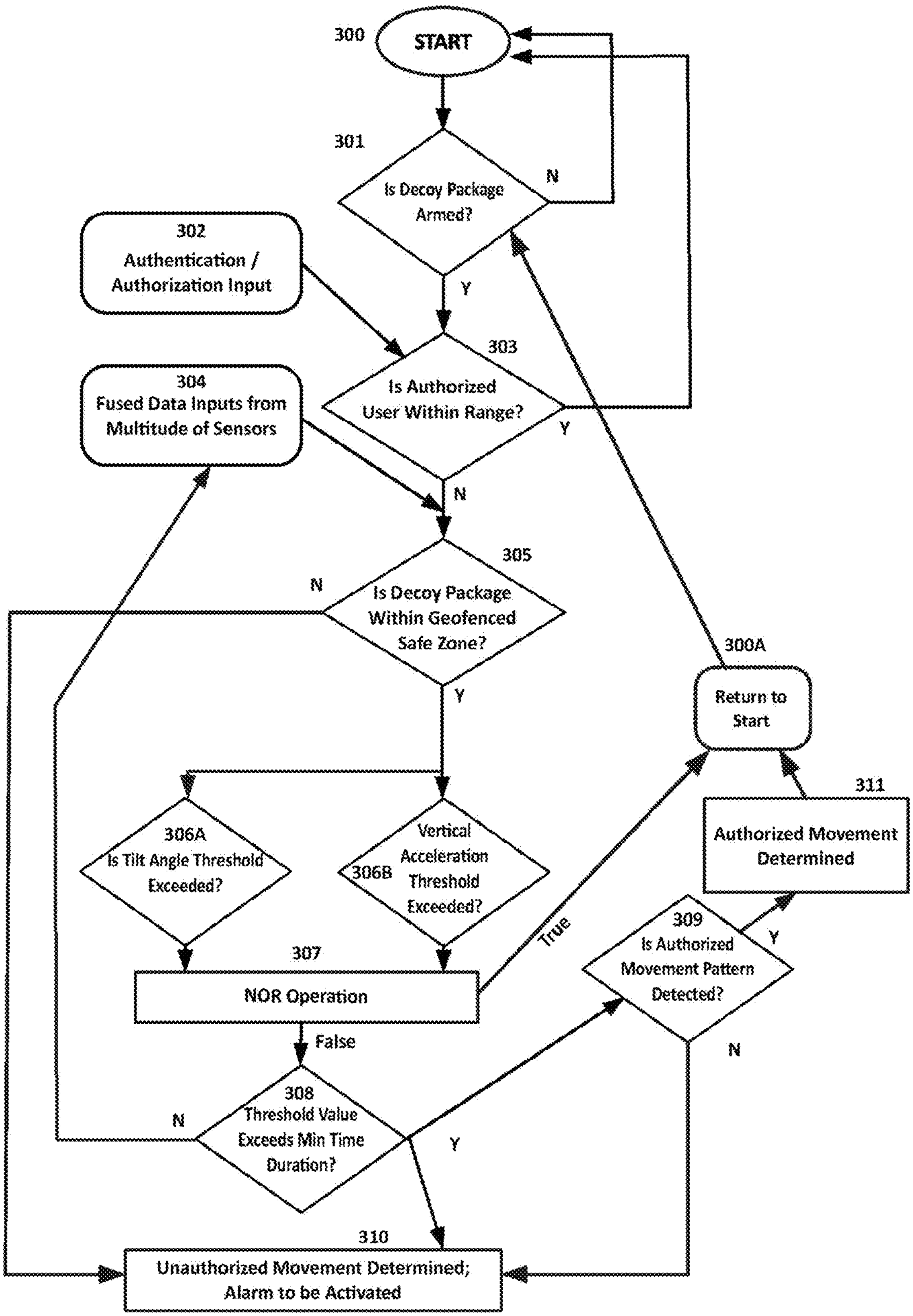
FIG. 5 illustrates an example motion-classification pipeline and thresholds.

FIG. 5 presents an example of how the controller 20 may determine an unauthorized movement of the decoy package 5, which would warrant triggering the alarm 50 and possibly other outputs. At a minimum, a method of deterring package theft with the system of the present invention would comprise: a) placing a decoy package 5 that outwardly resembles a delivered shipping parcel at a delivery location; b) arming the decoy package 5; c) sensing motion of the decoy package 5, d) classifying the sensed motion to distinguish incidental disturbances from a removal attempt; and e) responsive to the removal attempt, emitting an audible alarm of at least 90 dBA at 1 meter, after an activation delay between 0.5 and 3.0 seconds.

Referring again to FIG. 5, the controller 20 starts at step 300, then determines whether the decoy package 5 is armed in decision/step 301. If the decoy package 5 is not armed, the controller 20 may loop between steps 300 and 301 until the decoy package 5 is indeed armed. Once the decoy package 5 is indeed armed, then the controller 20 will collect the fused data inputs 304 from a multitude of sensors before proceeding to determine whether the movement pattern detected by the one or more motion sensors 35 is an unauthorized movement from a package thief or an authorized movement likely performed by an authorized user who may be setting up or performing maintenance on the decoy package 5 (from 301 and 304 to 306A-306B). Optionally, between decision 301 and decisions 306A-306B, the controller 20 may take into consideration additional authentication/authorization input 302, and may additionally evaluate decisions 303, 305. The controller 20 may define a geofenced safe zone 110A via a GPS module 45 and may inhibit the audible alarm 50 while the device remains within the geofenced safe zone 110A and/or is moved by an authorized user. Thus, the package theft deterring device further comprises a GPS module 45 for tracking and geofencing, wherein the alarm 50 activates upon existing a safe zone 110A. The determination (decision 303) of whether an authorized user is within range can be assisted by reading or receiving an authentication or authorization input, such as a short-range wireless key or token that can be detected or read by a transceiver 25 operably coupled to the controller 20, as in FIG. 2. Similarly, the GPS module 45 operably connected to the controller 20 can assist in determining (decision 305) whether the decoy package 5 is within a geofenced safe zone 110A defined by the controller 20.

In FIG. 5, the controller 20 can loop back to the start 300 to bypass motion detection if it determines that an authorized user is within range (Y path of decision 303). The controller 20 can optionally make a determination of unauthorized movement 310 and subsequently trigger an alarm 50 if the decoy package 5 is not within the geofenced safe zone 110A (N path of decision 305). If the decoy package 5 does not have an authorized user within range (N path of decision 303) while armed and while within a geofenced safe zone 110A as defined by the controller 20 (Y path of decision 305), then the controller 20 will proceed to evaluate the fused data inputs 304 from the multitude of its sensors in decisions 306A, 306B. Note that the real-time fused data inputs 304 are accessible by the processor 20 at any point at or after step/decision 303. Also, the evaluation of decisions 306A (whether the tilt angle threshold has been exceeded) and 306B (whether the vertical acceleration threshold has been exceeded) will generate either a True output or a False output to a Boolean operator in step 307 (a NOR gate in FIG. 5, but can be a more complex logical circuit operation if the system is evaluating more than 2 criteria, and if at least 2 criteria must be true for the system to detect and determine that the decoy package 5 was moved in an unauthorized manner).

In the specific example of FIG. 5 as illustrated, the Boolean operation 307 is a NOR operation, which will generate a "True" output only if both 306A and 306B evaluate to "False", and thus if the NOR operation 307 evaluates to true, it means neither the angle threshold has been exceeded, nor the vertical acceleration threshold. If one or both thresholds have been exceeded, then the NOR operation will result in a "False" output, and the controller 20 will proceed to evaluate in decision 308 whether the threshold value (either the tilt angle threshold from 306A or the vertical acceleration threshold from 306B) has lasted for at least a minimum time duration.

If the minimum time duration has not yet been exceeded, the decision-making pathway (N from decision 308) loops back to evaluate the fused data inputs 304 until the duration of either threshold has exceeded the minimum duration. Once the minimum time threshold has been exceeded, then the controller 20 may determine an unauthorized movement 310 directly, and activate the alarm 50 and optionally more deterrents available. Accordingly, the controller 20 determines the removal attempt of the decoy package 5 based at least on at least one of (i) tilt beyond a threshold angle for at least a threshold duration and (ii) vertical acceleration exceeding a threshold value. Note that in FIG. 5 the logic has been simplified to evaluate a common minimum threshold time duration for both the tilt angle and vertical acceleration. However, it should be noted that it would be well known to one of skill in the art that step 307 may be replaced by a more complex logic evaluation, where each motion sensor detection mechanism may have its own minimum threshold time.

In some embodiments, once decision 309 evaluates to yes, the controller may proceed to compare the fused movement data against authorized movement patterns previously learned via machine-learning algorithms (this optional decision applies only in adaptive embodiments). Decision 309 can only be implemented in adaptive embodiments, where the controller stores background motion statistics (authorized movement pattern profiles), learns typical handling patterns via machine-learning algorithms, and adjusts thresholds over time to reduce false alarms. In these embodiments, the controller 20 adapts one or more thresholds based on a stored background motion profile at a placement site or package delivery site using machine learning to learn handling patterns of typical authorized users. If decision 309 is relevant and evaluates to path Y (meaning the fused data from the motion sensors match the movement pattern learned via machine-learning algorithms, and thus correspond to "authorized" or "false alarm" movement), then the system will restart 300A. If decision 309 evaluates to path N (meaning that the fused data from the motion sensors do not match false alarm movement patterns stored in the controller 20), or if decision 309 does not apply because the system is not such an adaptive embodiment, then once the processor 20 determines that unauthorized movement has been detected over the minimum time threshold, the processor 20 will next actuate the audible alarm 50, and, optionally, other relevant deterrent outputs, such as activating a speaker 60 to produce a voice alert or actuating a haptic generator 65 to produce a vibration or physical motion to further spook a thief.

To elaborate upon these other relevant deterrent outputs, the method of deterring package theft may, in addition to activating an audible alarm 50 after an activation delay in step (d), further comprise flashing one or more visual indicators 55 while the audible alarm 50 is emitted. Alternatively or additionally, the method of deterring package theft may further comprise publishing an alarm event to a home security system. As discussed previously, the method of deterring package theft may optionally further comprise defining a geofenced safe zone within which authorized movement does not trigger the audible alarm 50 (see FIG. 5). The method of deterring package theft may have the classification of the sensed motion to distinguish incidental disturbances from a removal attempt in step (d) comprise evaluating at least a tilt threshold and a vertical acceleration threshold over a minimum time window using fused data from multiple sensor types. The method of deterring package theft may further comprise activating a speaker 60 to play a voice alert. The method of deterring package theft may also further comprise actuating a haptic generator 65 within the decoy package 5 to produce a vibration or physical motion. Finally, the package theft deterring method may further comprise deploying a plurality of decoy packages 5, each with customizable exteriors and multi-stage alarms 50 starting with a warning tone, as discussed earlier in the paragraphs on alarms.

Figure 6:
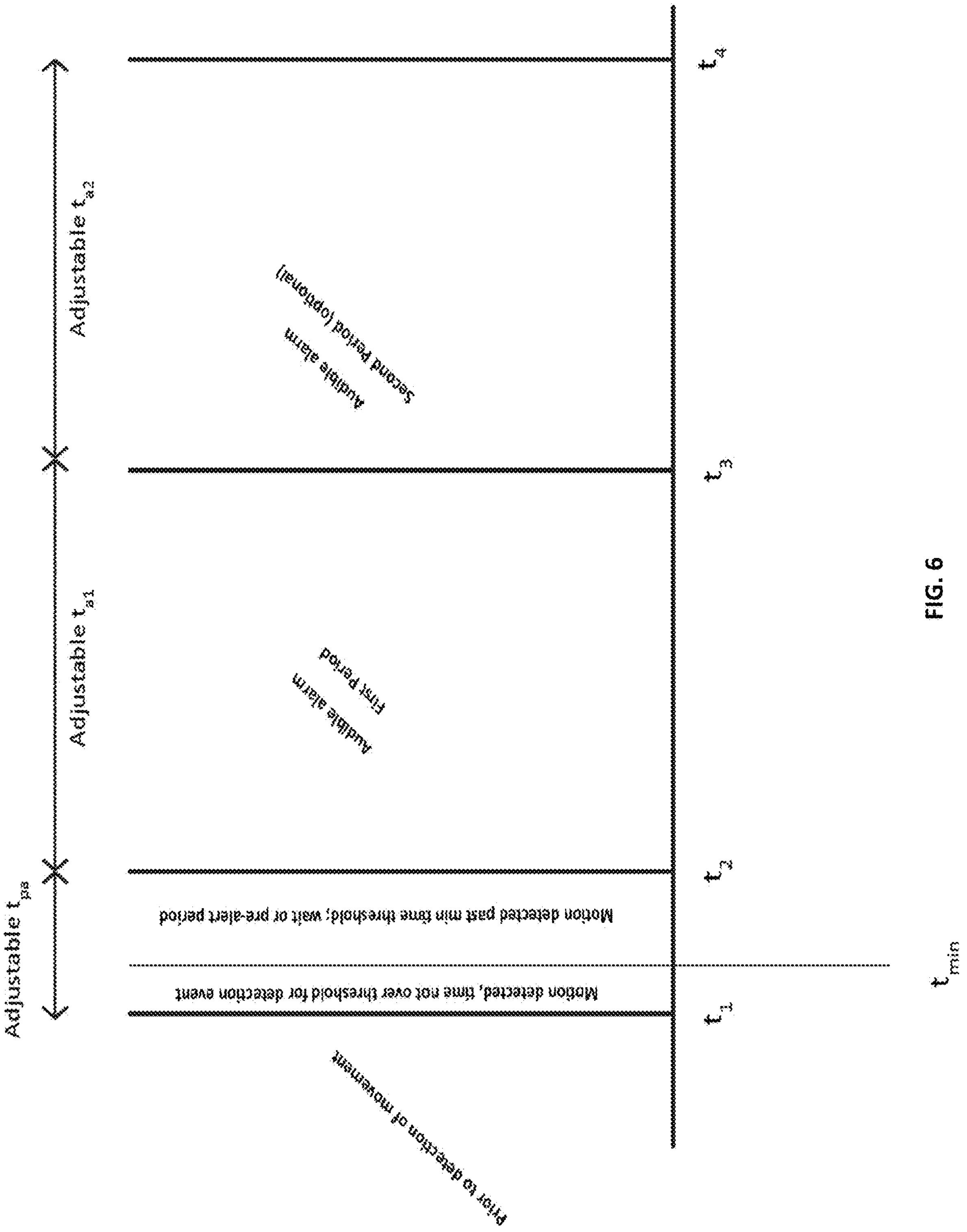
FIG. 6 depicts timing for staged pre-alert and alarm activation with an adjustable delay window.

FIG. 6 facilitates a more detailed discussion of a multi-stage system and the adjustable pre-alert, first audible alarm, and second audible alarm durations. In FIG. 6, movement is first detected at time $t_1$. At some point after $t_1$, there will be a $t_{min}$ that corresponds to the time at which the elapsed time since the first detection has met the minimum time threshold or duration. Between $t_1$ and $t_{min}$, the unauthorized motion has been detected, but the system is still waiting for the motion to persist until it exceeds the minimum time threshold of $t_{min}$. At time $t_2$, the device triggers the first period of an audible alarm from $t_2$ until $t_3$. The period between $t_{min}$ and $t_2$ represents the pre-alert period during which the system is waiting for the activation delay (as a non-limiting example, this may be between 0.5 to 3.0 seconds). After the first period of an audible alarm from $t_2$ until $t_3$, the system may optionally trigger a second period of the audible alarm from $t_3$ until $t_4$. Optionally, after $t_4$ the system may implement a lockout period. The pre-alert time duration $t_{pa}$, first alarm duration $t_{a1}$, and second alarm duration $t_{a2}$ are adjustable by an authorized user via a user interface 200. In one embodiment, the controller 20 of the decoy package 5 may enforce compliance with a maximum duty cycle for the audible alarm 50. In another embodiment, the audible alarm 50 may be a multi-stage system configured to initially emit a warning tone for a first period $t_{a1}$ and subsequently emit a high-volume alarm (during $t_{a2}$) if movement continues.

Figure 7:
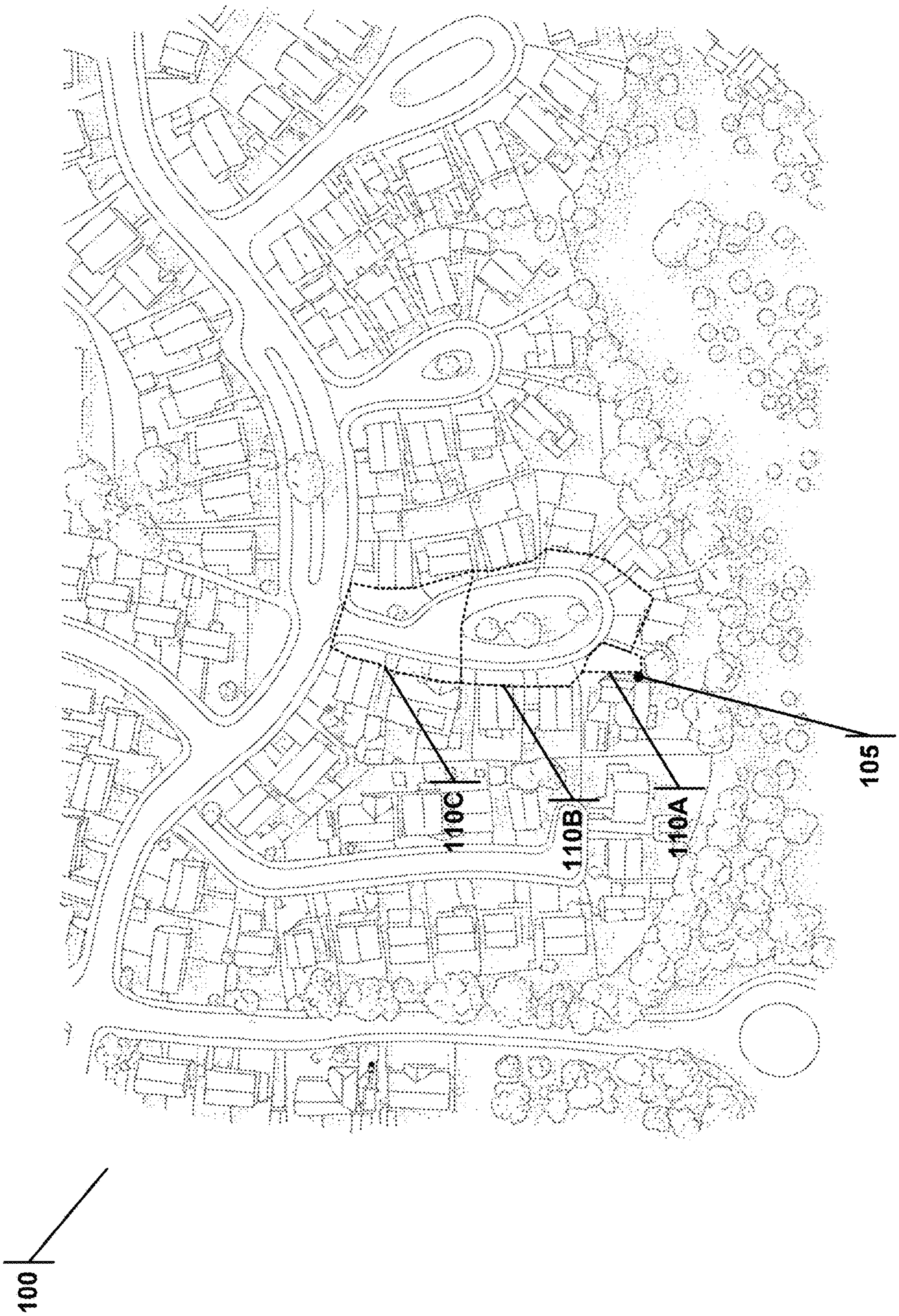
FIG. 7 illustrates a geofenced safe zone and transition-based arming/alarms.

FIG. 7 shows how various geofenced zones in a neighborhood 100 may be set up with the assistance of a GPS module 45 inside a decoy package 5. Alternatively, an authorized user may be able to set up the geofenced zones via a user interface 200 on a remote device or a mobile application. In FIG. 7, the decoy package location 105 is indicated by the solid dot adjacent to a doorway or porch. The geofenced safe zone 110A comprises the driveway leading up to the decoy package location 105. Outside of the geofenced safe zone 110A are geofenced alert zones 110B and 110C. If the decoy package 5 is moved in the absence of an authorized user to one of the geofenced alert zones 110B, 110C, the alarm 50 will sound, and the additional deterrents such as visual indicators 55, recorded voice warnings, and event signals to home security systems may activate.

Figure 8:
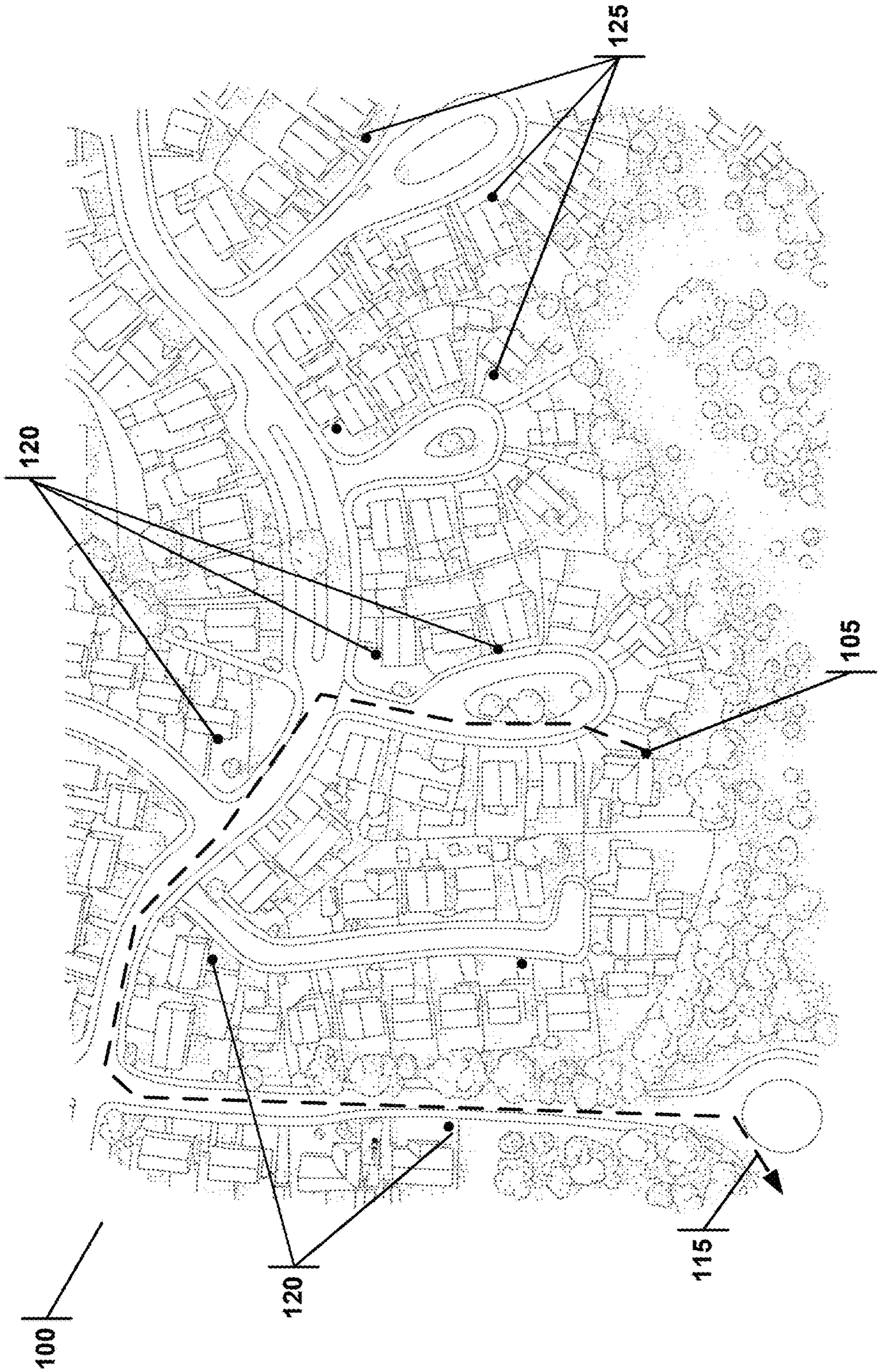
FIG. 8 shows a neighborhood mesh with peer-to-peer alert propagation among multiple decoys.

FIG. 8 illustrates using the package theft deterring devices in a peer-to-peer network. A plurality of decoy packages 5 may be configured to communicate via a low-power wireless mesh, wherein detection of a removal attempt by any one device causes the plurality of devices to emit audible alarms 50 in coordination. A first device that detects the removal attempt transmits an identifier associated with the first device, and each other device logs the identifier while emitting its own audible alarm. The plurality of decoy package 5 thus form a peer-to-peer network that can coordinate individual devices to activate alarms within the same neighborhood 100 along a package theft route 115. In addition, the plurality of devices may synchronize activation timing within 100 ms and transmit location data via GPS to a remote service. Furthermore, each device may be configured to emit a different audible alert, and the system establishes a wireless network for coordinated response, including simultaneous activation of multiple decoy package alarms. The overlapping multitude of different audible alerts in the same neighborhood 100 along a package theft route 115 would be even more cacophonous and psychologically overwhelming to a package thief than a single audible. The system may include synchronized alarms, unique device identifiers for each decoy in the mesh, and log transmission. From the log transmission, the system can determine when the package was taken, and the route the thief took to escape.

In FIG. 8, if a decoy package 5 is removed from its location 105 and taken along the package theft route 115 represented by the dashed line, the moved decoy package 5, which detects the first removal attempt, would signal its identifier transmitted along the peer-to-peer network. Then, other decoy packages 120 located within the wireless transmission distance of the moving first decoy package 5 would log the identifier transmitted and would all emit their own audible alarms 50. The decoy packages 125 are too far from the package theft route 115 to receive the wireless transmission from the first decoy package 5 that has been moved along the package theft route 115, and so within the neighborhood 100 some peer-to-peer decoy packages would sound alarms or alerts (peer-to-peer decoy packages 120), while others would not (peer-to-peer decoy packages 125). This data could subsequently be analyzed to determine the path along which the package thief made their escape, and appropriately location-specific security footage could be pulled by community or law enforcement authorities to identify and catch the thief.

Figure 3A:
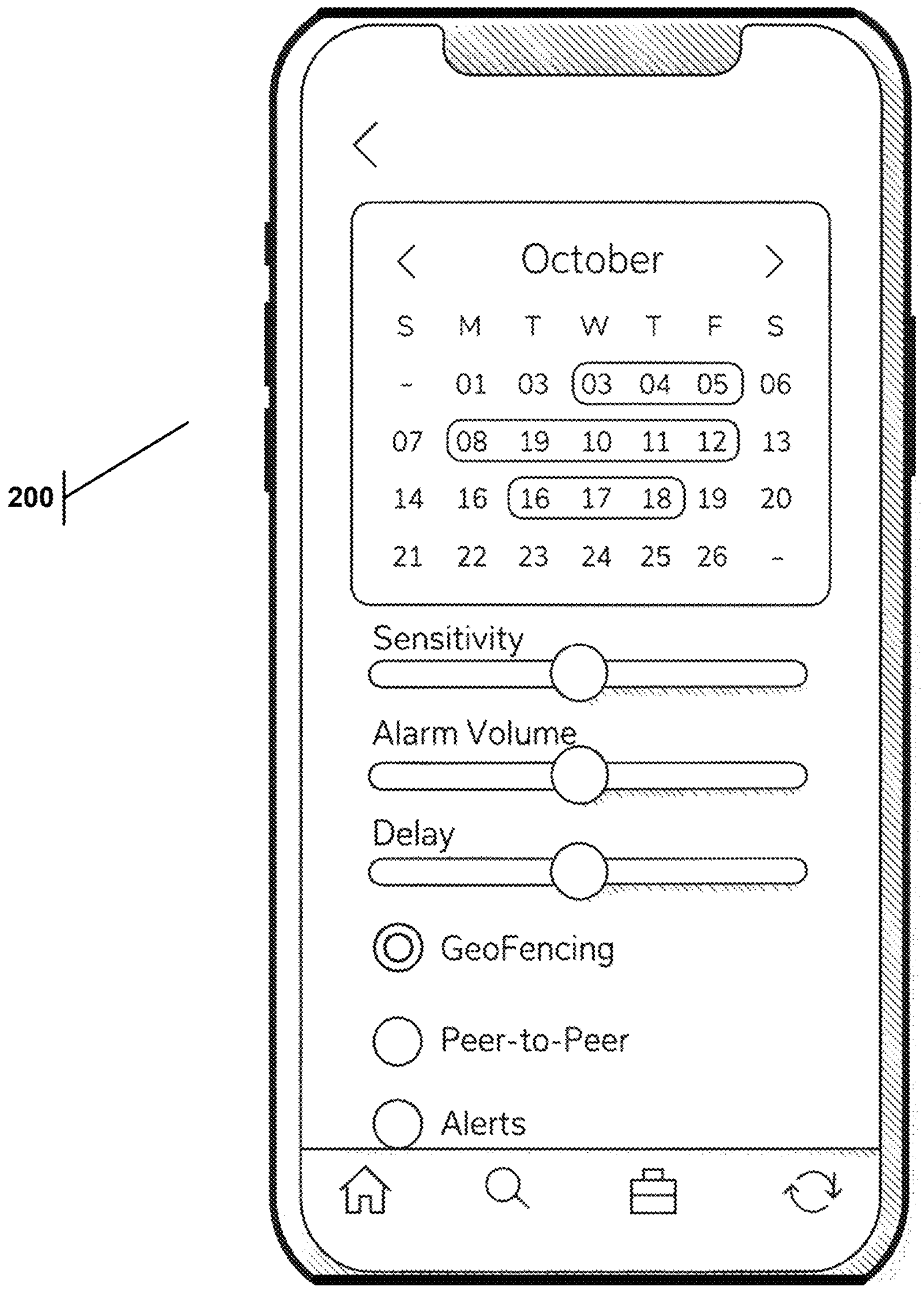
FIG. 3A shows an example user interface for arming, scheduling, and sensitivity adjustments.
Figure 3B:
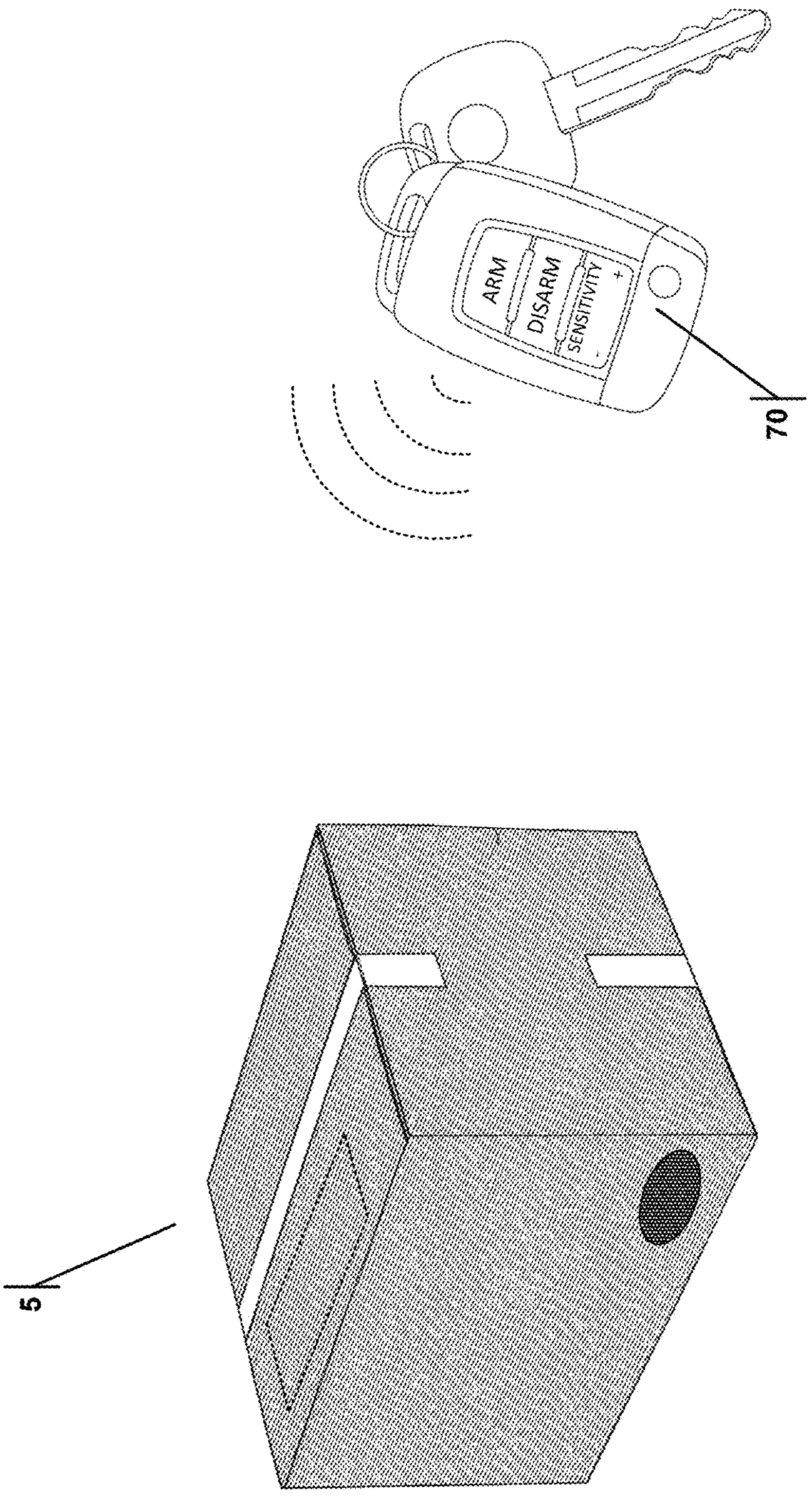
FIG. 3B illustrates a wireless remote used in conjunction with the decoy package.

FIG. 3A presents an example of a graphical user interface 200 on a mobile device or application. The user interface 200 may comprise controls where the user may adjust the sensitivity of the one or more motion sensors 35, the volume of the alarm 50, and the pre-alerting delay time. An authorized user may, via the graphical user interface 200, determine when the decoy package 5 is to be armed (selection of dates on the calendar), as well as configure the decoy package 5 in various modes or options, such as GeoFencing and/or Peer-to-Peer. The user may also opt to read Alerts in the user interface 200, which may include alerts from the individual decoy package 5, or alerts of other decoy packages in the neighborhood 100.

ILLUSTRATIVE EXAMPLES: The following examples are provided to illustrate specific embodiments of the present invention and to demonstrate its effectiveness in various scenarios. These examples are not intended to limit the scope of the invention.

Example 1, Basic Decoy Package Alarm System: A decoy package is constructed using a standard cardboard box measuring 12 inches×9 inches×6 inches, designed to resemble a typical e-commerce delivery package. The exterior of the box is printed with generic shipping labels and barcodes to enhance authenticity. Inside the box, a motion sensor utilizing a 3-axis accelerometer is mounted on a PCB at the center of the package. The accelerometer is configured to detect changes in acceleration exceeding 0.2 g in any direction. A small speaker capable of producing a 100 dB alarm sound is connected to the PCB and positioned near the top of the package for maximum sound projection. A 9V battery powers the system, with an expected operational life of approximately 6 months in standby mode. A small microcontroller runs the control software, which includes a 2-second delay between motion detection and alarm activation. The system is armed and disarmed using a small remote control operating at 433 MHz. When the armed decoy package 5 is moved, the alarm emits a series of high-pitched beeps at 100 dB for 2 minutes before automatically shutting off to conserve battery.

Example 2, Integration with Home Security System: The decoy package alarm system is configured to integrate with a popular smart home security platform. The PCB inside the decoy package includes a Wi-Fi module that connects to the home network. When the motion sensor detects movement of the package, it not only activates the audible alarm after a 1.5-second delay but also sends a notification to the homeowner's smartphone via the security system's app. The app provides options to view live feeds from any connected security cameras, contact emergency services, or remotely extend the alarm duration. The integration is achieved through an API provided by the security system manufacturer, allowing for seamless communication between the decoy package and other security devices in the home.

Example 3, Multiple Decoy Package Deployment Strategy: A homeowner experiencing frequent package theft deploys three decoy packages with different appearances. The first resembles a small electronics shipment with recognizable tech company branding, the second mimics a clothing delivery package from a popular online retailer, and the third appears to be a generic brown shipping box. Each package contains an identical alarm system but is configured with different alarm sounds: the first emits a traditional siren, the second produces a voice recording saying 'Theft detected! Package is being tracked!', and the third generates a series of rapid beeps. The packages are placed visibly on the porch along with genuine deliveries. When a thief attempts to steal one of the decoy packages, the alarm activates after a 2-second delay, startling the thief and potentially deterring them from taking any packages, including the genuine ones.

Example 4, Manufacturing Process for Commercial Production: The commercial manufacturing process for the decoy package alarm system involves the following steps:

PCB fabrication with surface-mounted components including a microcontroller, accelerometer, battery management system, and wireless communication module.

Enclosure production using cardboard manufacturing processes identical to those used for standard shipping boxes.

Speaker and battery integration with the PCB using soldered connections and secure mounting brackets.

Software installation on the microcontroller, including motion detection algorithms, alarm control logic, and wireless communication protocols.

Final assembly of all components within the cardboard enclosure, designed for easy battery replacement through a concealed access panel.

Quality control testing of each unit, including sensitivity calibration, alarm volume verification, and wireless communication range testing.

Example 5, Study to Determine Effectiveness: In some implementations, a study may be conducted to compare the effectiveness and cost-efficiency of the decoy package alarm system with traditional package theft prevention methods. The study may involve 1000 households in a suburban area with a history of package theft incidents. For the study, 500 households may be equipped with the decoy package alarm system, while the other 500 may use conventional methods such as security cameras or lockboxes. Over a six-month period, data on package theft attempts, successful thefts, and associated costs may be collected and analyzed. The results of the study may show that households using the decoy package alarm system experience a 75% reduction in package theft attempts compared to a 40% reduction for those using traditional methods. In terms of successful thefts, the decoy system may demonstrate a 90% decrease, while conventional methods may only achieve a 60% reduction. Cost analysis may reveal that the average household spent $150 on the decoy package alarm system, including the initial purchase and minimal maintenance costs over the six-month period. In contrast, households using traditional methods may have spent an average of $300 on security cameras or $200 on lockboxes, with additional costs for installation and maintenance. When considering the value of stolen packages, households with the decoy system may report an average loss of $50 over the six-month period, compared to $200 for those using conventional methods. This difference may translate to a net savings of $300 per household for the decoy system users when factoring in both prevention costs and losses from theft. In terms of user satisfaction, the study may find that 95% of decoy system users report feeling more secure about their package deliveries, compared to 70% of those using traditional methods. The ease of use and low maintenance requirements of the decoy system may be cited as key factors contributing to higher satisfaction rates. The study may also examine the impact on delivery services. Delivery personnel may report a 30% reduction in time spent attempting to secure packages for households using the decoy system, as they can simply leave packages as usual. This may lead to increased efficiency and potentially lower delivery costs for shipping companies. In a separate marketing analysis, the decoy package alarm system may demonstrate significant advantages in terms of customer acquisition and retention. The study may find that the novel and intuitive nature of the decoy system results in a 40% higher conversion rate in online and in-store sales compared to traditional security products. Additionally, the decoy system may show a 25% lower customer acquisition cost due to increased word-of-mouth referrals and viral social media sharing. Customer retention rates for the decoy system may be 85% after one year, compared to 60% for traditional security products, potentially due to its effectiveness and low maintenance requirements. These findings may suggest that the decoy package alarm system not only provides superior protection against package theft but also offers significant cost savings and marketing advantages compared to current solutions. The combination of effectiveness, affordability, and user satisfaction may position the decoy system as a promising innovation in the field of package security.

OTHER EMBODIMENTS: The detailed description setforth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

Persons of ordinary skill in the art are aware that the use cases, structures, schematics, flow diagrams, and steps described and implied herein may be performed in any order or sub-combination without departing from the broader scope of the inventive concept disclosed herein. Every embodiment may be unique, and step(s) of method(s) may be either shortened or lengthened, overlapped with other activities, postponed, delayed, and/or continued after a time gap.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter.

As used herein, the singular forms "a," "an," and "the" include plural references unless the context clearly indicates otherwise. Thus, for example, reference to "a cable" includes a single cable as well as a bundle of two or more different cables, and the like. The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes, parameters, etc., to provide a thorough understanding of the present disclosure. The features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art. "Substantially identical" pieces or parts means identical other than different markings, colors, or nonfunctional aspects, if any, and identical other than normal manufacturing variations.

Although the present disclosure has been described with reference to specific exemplary embodiments, it will be evident that the various modifications and changes can be made to these embodiments without departing from the broader scope of the disclosure. Accordingly, the specification and drawings are to be regarded in an illustrative sense rather than in a restrictive sense. It will also be apparent to the skilled artisan that the embodiments described above are specific examples of a single broader disclosure which may have greater scope than any of the singular descriptions taught. There may be many alterations made in the descriptions without departing from the scope of the present innovation, which is defined solely by the claims.

The invention claimed is:

1. A device for deterring package theft at a delivery location, comprising:

a housing configured as a decoy package that outwardly resembles a commercially delivered shipping parcel, wherein the housing comprises a corrugated carton or polymailer;

one or more motion sensors disposed within the housing;

a controller operatively coupled to the one or more motion sensors; and an audible alarm operatively coupled to the controller, wherein, when the device is in an armed state, the controller is configured to process and classify sensor data, including at least one of a tilt threshold and a vertical acceleration threshold to detect a removal attempt and, in response to detecting the removal attempt, activate the audible alarm to emit an acoustic output of at least 90 dBA measured at 1 meter;

wherein the removal attempt is a motion characteristic of lifting or carrying away the housing.

2. The device of claim 1, wherein the activation of the audible alarm is delayed between 0.5 seconds and 3.0 seconds from the detection of the removal attempt.

3. The device of claim 1, wherein the one or more motion sensors comprise at least two different sensor types selected from the group consisting of: an accelerometer, a gyroscope, a tilt sensor, a pressure sensor, a weight sensor, a barometric sensor, a vibration sensor, an elevation change sensor, and a proximity sensor, and wherein the controller is configured to fuse outputs from the at least two different sensor types to classify motion and reduce false alarms.

4. The device of claim 1, further comprising one or more visual indicators operatively coupled to the controller and configured to flash when the audible alarm is activated, wherein the visual indicators emit a strobe effect and/or multicolor illumination configured to enhance deterrence.

5. The device of claim 1, wherein the controller is configured to enforce an alarm duration of between 60 seconds and 180 seconds and a lockout interval thereafter during which the audible alarm is inhibited.

6. The device of claim 1, further comprising a wireless interface operatively coupled to the controller and configured to receive at least one of an arm command or a disarm command from a remote control or a mobile application, and to transmit alarm events to an external device or system.

7. The device of claim 6, wherein the wireless interface is further configured to transmit an alarm event to a home security system to trigger at least one of a notification or camera activation.

8. The device of claim 1, further comprising an anti-tampering sensor operatively coupled to the controller and configured to trigger the audible alarm upon detection of the housing being opened while the device is in the armed state, wherein the anti-tampering sensor comprises at least one of a reed switch, micro-switch, or pressure sensor.

9. The device of claim 1, further comprising a GPS module operatively coupled to the controller, wherein the controller is configured to (i) define one or more geofenced safe zones based on GPS module data, and (ii) inhibit activation of the audible alarm while the device remains within a defined safe zone or is moved by an authenticated user.

10. The device of claim 1, wherein the controller is configured to detect the removal attempt based at least in part on: (i) a tilt exceeding a threshold angle for a threshold duration, or (ii) a vertical acceleration exceeding a threshold value.

11. The device of claim 1, wherein the audible alarm is configured to emit at least one of a frequency-swept siren pattern, a multilingual voice-synthesized warning, or both.

12. The device of claim 1, wherein the audible alarm is configured as a multi-stage alarm system to initially emit a warning tone for a first period and subsequently emit a high-volume alarm if motion continues.

13. The device of claim 1, further comprising a haptic generator operatively coupled to the controller and configured to produce at least one of a vibration or a physical motion upon detection of the removal attempt.

14. The device of claim 1, wherein the controller is configured to publish an alarm event to a home automation hub to trigger additional devices.

15. A system for deterring package theft, comprising a plurality of devices according to claim 1, wherein each device is configured to communicate with others via a low-power wireless mesh network, and wherein detection of a removal attempt by a first device of the plurality causes the plurality of devices to activate their respective audible alarms in coordination.

16. The system of claim 15, wherein the first device is configured to transmit an identifier associated with the first device upon detecting the removal attempt, and wherein each other device is configured to log the identifier while activating its audible alarm.

17. A method of deterring package theft at a delivery location, comprising:

placing a decoy package that outwardly resembles a delivered shipping parcel at the delivery location, wherein the decoy package comprises a housing comprising a corrugated carton or polymailer;

arming the decoy package;

sensing motion of the decoy package using one or more motion sensors disposed within the decoy package;

classifying, using a controller operatively coupled to the one or more motion sensors, the sensed motion to detect a removal attempt from the delivery location; and in response to detecting the removal attempt, activating an audible alarm operatively coupled to the controller to emit an acoustic output of at least 90 dBA measured at 1 meter;

wherein the removal attempt is a motion characteristic of lifting or carrying away the decoy package.

18. The method of claim 17, wherein the activation of the audible alarm is delayed between 0.5 seconds and 3.0 seconds from the detection of the removal attempt.

19. The method of claim 17, further comprising coordinating alarms with at least one additional decoy package via wireless communication.

20. The method of claim 17, further comprising transmitting an alarm event to a home security system.

21. The method of claim 17, further comprising defining a geofenced safe zone within which authorized movement does not trigger activation of the audible alarm.

22. The method of claim 17, wherein classifying the sensed motion comprises evaluating at least a tilt threshold and a vertical acceleration threshold over a minimum time window using fused data from multiple sensor types.

23. The method of claim 17, further comprising deploying a plurality of decoy packages, each with a customizable exterior and a multi-stage alarm configured to start with a warning tone.

24. A device for deterring package theft used with a shipping parcel at a delivery location, the device comprising:

a housing configured as a decoy package that outwardly resembles a commercially delivered shipping parcel, wherein the housing comprises a corrugated carton or polymailer;

one or more motion sensors disposed within the housing;

a controller operatively coupled to the one or more motion sensors; and an audible alarm operatively coupled to the controller, wherein, when the device is in an armed state, the controller is configured to process and classify sensor data, including at least one of a tilt threshold and a vertical acceleration threshold to detect a removal attempt and, in response to detecting the removal attempt, activate the audible alarm to emit an acoustic output of at least 90 dBA measured at 1 meter;

wherein the removal attempt is a motion characteristic of lifting or carrying away the housing.

25. The device of claim 24, wherein the activation of the audible alarm is delayed between 0.5 seconds and 3.0 seconds from the detection of the removal attempt.

26. The device of claim 24, further comprising a mounting structure connected to the housing and configured to mount to the interior of the shipping parcel.

27. The device of claim 26, wherein the mounting structure is a clip or an adhesive.

* * * * *